Oct. 13, 1953     F. S. STERNAD ET AL     2,655,321
TIRE BUILDING APPARATUS
Filed July 29, 1949     4 Sheets-Sheet 4
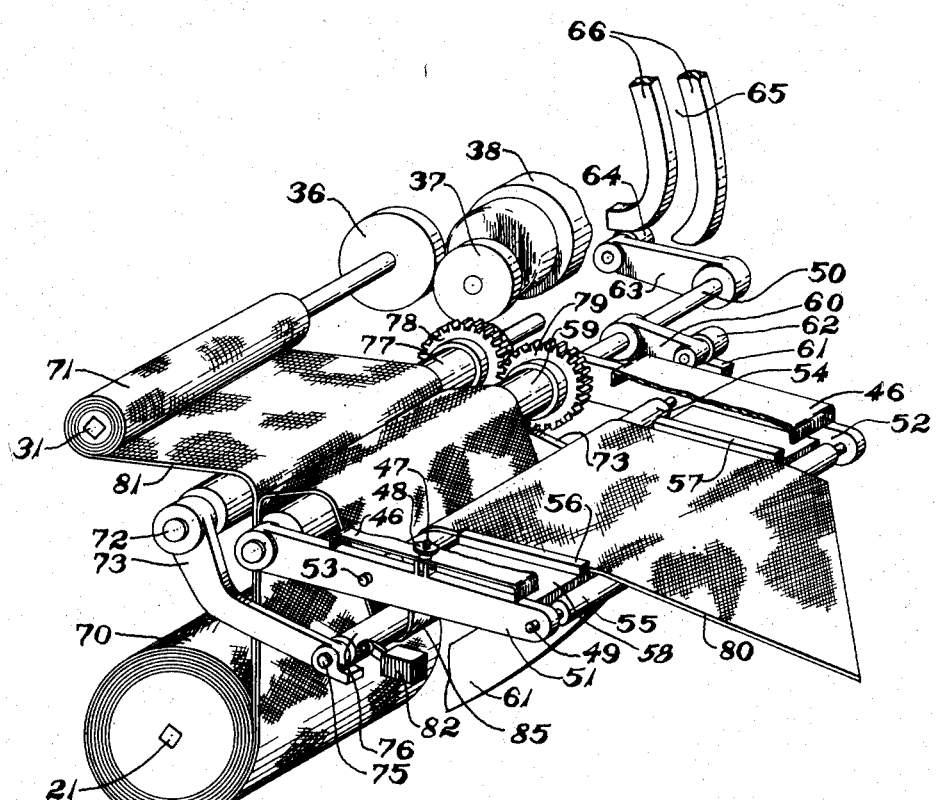
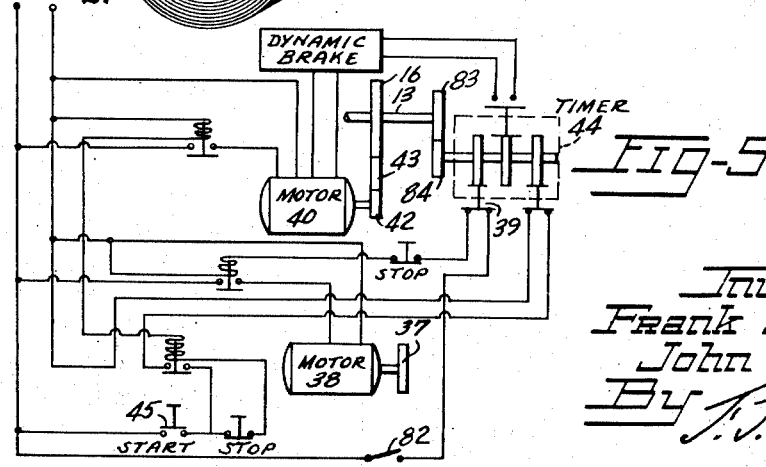
Inventors
Frank S. Sternad
John P. Sapp Patented Oct. 13, 1953

2,655,321

UNITED STATES PATENT OFFICE 2,655,321

TIRE BUILDING APPARATUS

Frank S. Sternad, Cuyahoga Falls, and John P. Sapp, Kent, Ohio, assignors to The B. F. Goodrich Company, New York, N. Y., a corporation of New York Application July 29, 1949, Serial No. 107,454

12 Claims. (Cl. 154—10)

This invention relates to tire building apparatus and more particularly to stock feeding mechanism for supplying material to a building drum. The invention is especially useful in the building of tires by the drum-building method employing cord fabric material.

In the building of cord tires by the drum-building method sheet material has been applied in successive plies about a substantially flat-faced drum. The material has been applied with little or no tension as tension of the fabric is undesirable. After plies of the material have been applied stitching or rolling mechanism has been employed to form the peripheral margins of the cord material about bead cores at the lateral margins of the drum.

The stitching and rolling of the material has required considerable mechanism which has interfered with the support of the fabric close to the drum during its application thereto. Difficulty has also been experienced in storing a sufficient quantity of material close to the drum for delivery thereto in uniform condition as to its state of tension.

The present invention has for an object to store a large quantity of sheet material in a small space and to deliver it in the desirable state of tension close to a building drum.

Other objects are to reduce stretching of the tire material and to provide positive separation of the cord material from the liner with which it is interwound without stretching of the material.

Further objects are to provide for superior feeding of the material to the drum by power, to provide more accurate guiding of the material to the drum, to provide for elimination of hanging ends of the material, to provide improved accommodation of stitching mechanism, to provide power-driven indexing movements of the stock support, and to provide conveniently for loading of the stock support.

These and other objects will appear from the following description and the accompanying drawings.

Of the drawings,

Fig. 4 is a perspective view showing the feeding table with its cover broken away and the liner rewinding and fabric looping mechanism together with portions of the table controlling cams, parts being broken away.

Fig. 5 is a simplified wiring diagram of the apparatus.

Figure 1:
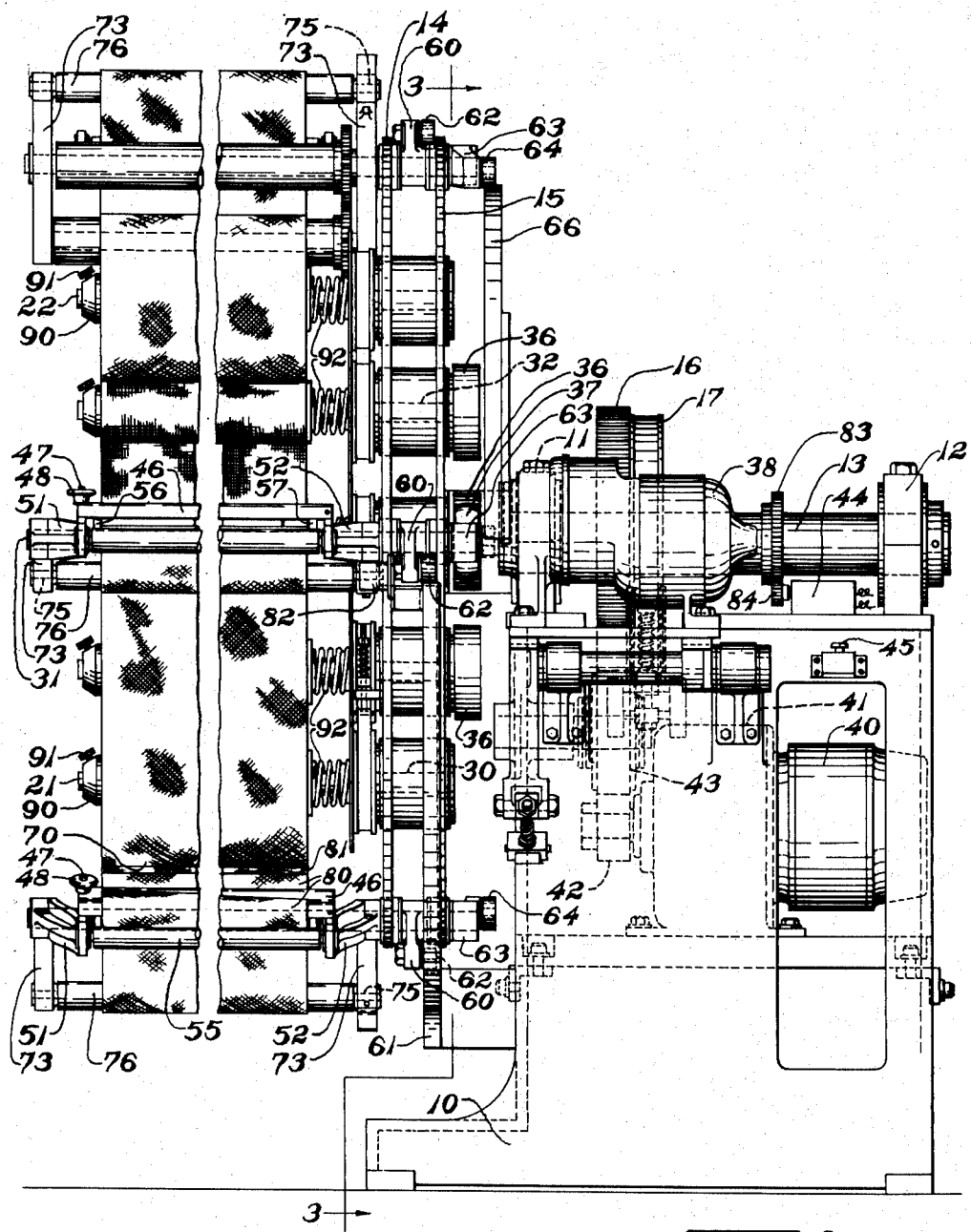
Fig. 1 is an elevation of apparatus constructed in accordance with and embodying the invention, as viewed from the position of the building drum, parts being broken away.

Referring to the drawings, the numeral 10 designates a frame having bearings 11, 12 which rotatably support a shaft 13 mounted for free rotation about a horizontal axis. A pair of discs 14, 15 are secured to the shaft in spaced apart relation. A gear 16 and a brake drum 17 are also fixed to the shaft.

For supporting rolls of cord tire material, a plurality of shafts 20, 21, 22, 23 are rotatably mounted on the discs 14, 15 parallel to shaft 13. These shafts are of square cross section beyond the discs to the left of Fig. 1 and their outboard ends are unsupported so that rolls of cord material may be mounted thereon. Each shaft 20, 21, 22, 23 has a brake drum such as 25 on shaft 20 fixed thereto and a brake band 26 mounted on disc 14 engages the drum to provide frictional resistance. The bands are adjustable and for this purpose their ends are connected to tension screws 27.

For winding the liners, a plurality of shafts 30, 31, 32, 33 are also rotatably mounted on discs 14, 15 and have projecting square portions for engaging stock shells. These shafts are also parallel to the shaft 13 and are arranged closer thereto than the shafts 20, 21, 22, 23. They are similarly provided with brake drums 34 for engagement with adjustable brake bands 35. They also have pulleys 36 fixed to the shafts and engageable at one position with a friction driving wheel 37 fixed to a shaft of a motor and speed reducer unit 38 mounted on frame 10.

For rotating the discs 14, 15 about their axis, a motor 40 directly drives a speed reducer 41 having a pinion 42 which drives gear 16 through an intermediate gear 43.

Figure 2:
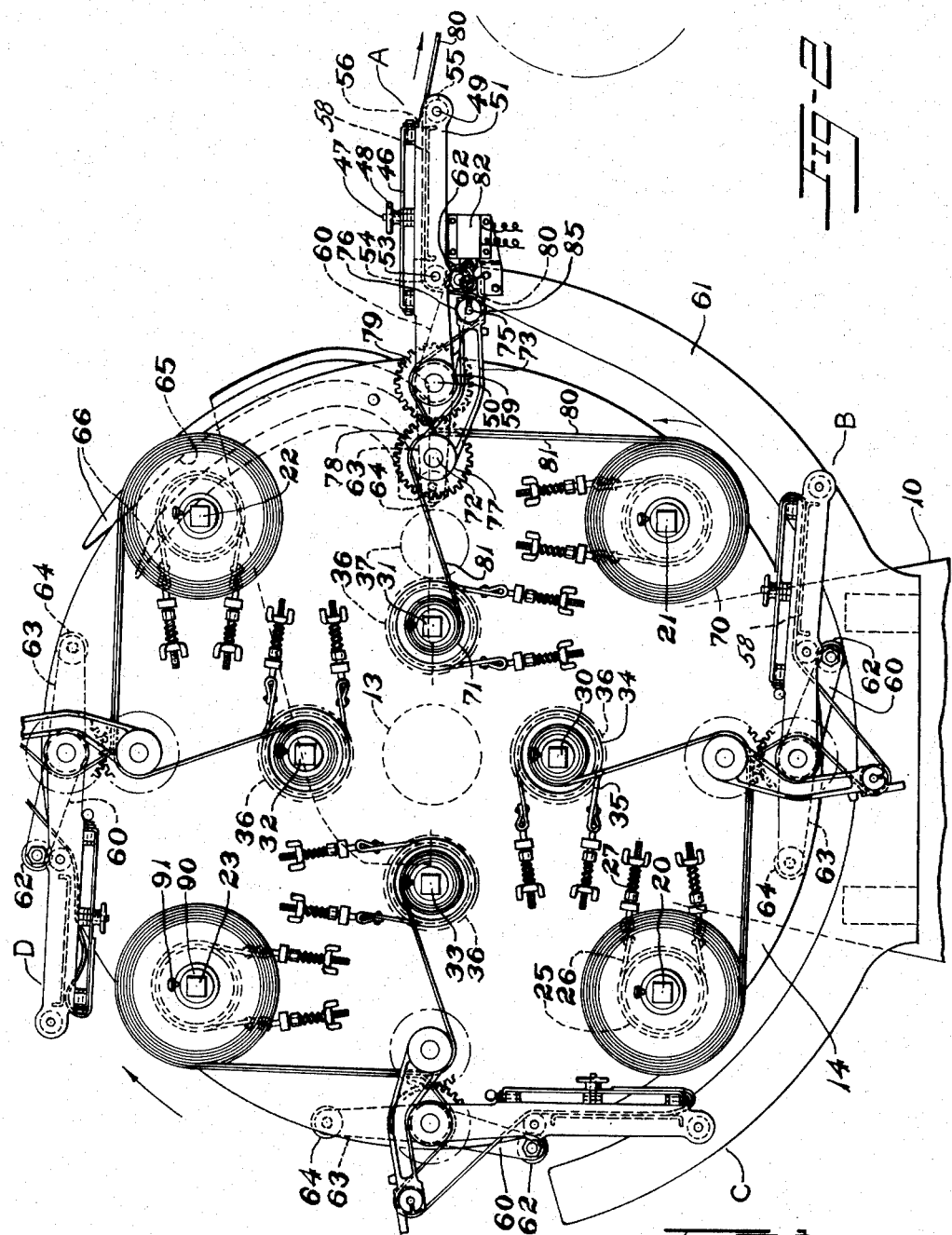
Fig. 2 is an end view thereof, parts being broken away.
Figure 3:
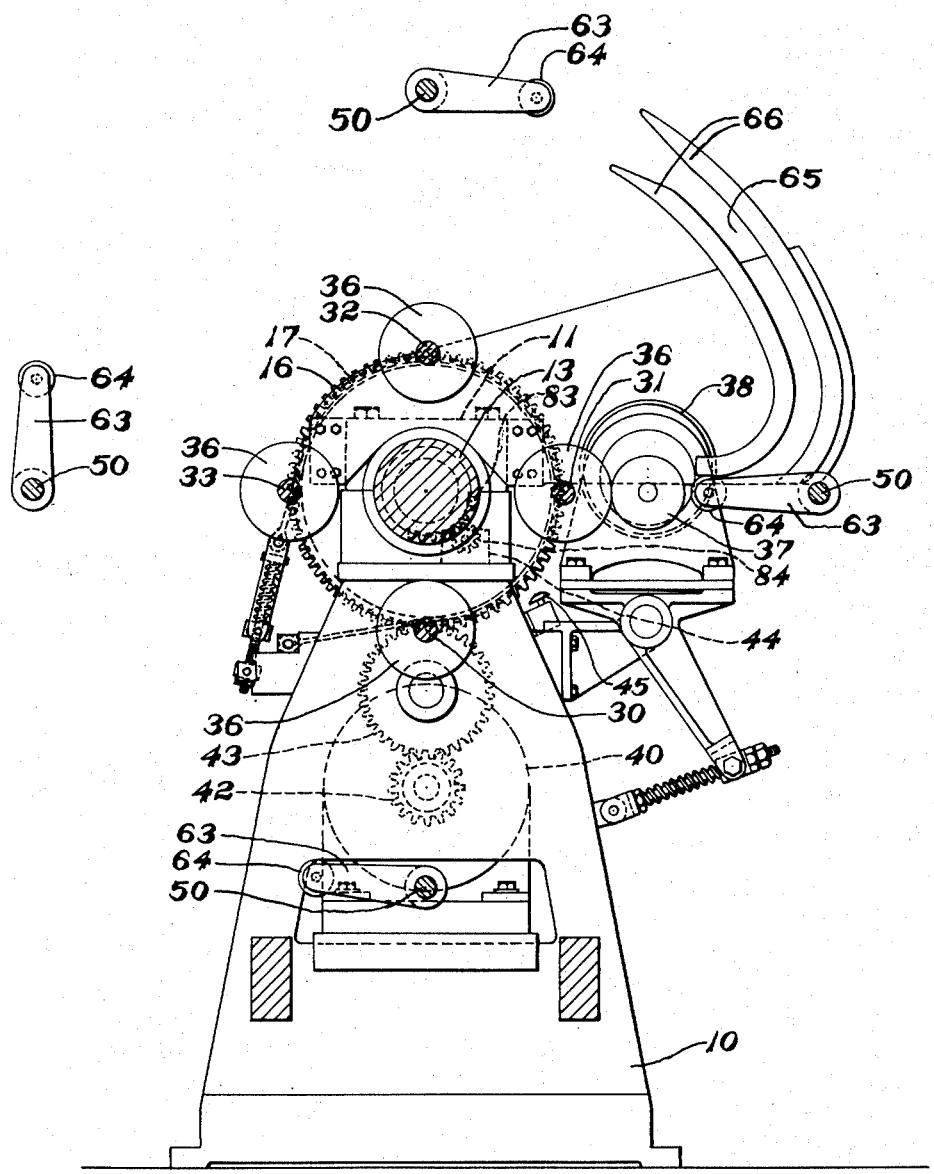
Fig. 3 is a cross-sectional view thereof, taken on line 3—3 of Fig. 1.

The reel comprising discs 14, 15 and their supported rolls may be rotated through an arc of a circle from position to position, as many positions being provided as the reel has rolls of material to bring each roll into the position of roll 70 in Fig. 2, in succession. For this purpose the motor 40 is operable at two speeds and is wired for dynamic braking. A cam type circuit-operating timer 44 is provided driven through gears 83, 84 from shaft 13, and the motor circuit is so controlled that a push button 45 starts the motor and consequently the timer. Near the end of the arc of movement of the reel, a cam on the timer reduces the speed of the motor and as the reel nears the stopping position the motor feed circuit is opened and dynamic braking is applied to the motor in a well known manner to stop the reel at the desired position.

For guiding the material to close proximity of the surface of the building drum and at the same time providing for withdrawal of the guides at other positions, a shaft 50 is rotatably mounted at a feeding position of the reel and parallel to shaft 13. A feed table 58 is mounted on the reel for swinging movement from a retracted position as shown at B in Fig. 2, to an extended position as shown at A, and for this purpose a pair of arms 51, 52 are fixed to shaft 50 in spaced apart relation. Rods 49, 53 extend between the arms and free running rollers 54, 55 are rotatably mounted thereon to support the material. Adjustable fences or guides 56, 57 are secured to the feed table provided by arms 51, 52 and rollers 54, 55. A cover 46 for the feed table 58 is hinged to arm 52 and secured to arm 51 by a bolt 47 and thumb nut 48. The cord material passes over rollers 54, 55 between fences 56, 57 and is prevented from climbing over the fences by cover 46 which, when closed, contacts the fences. A guide roller 59 is rotatably mounted on shaft 50 for guiding the material to the feed table.

For controlling movement of the feed tables, one of which is provided for each roll of cord fabric material, an arm 60 is fixed to shaft 50 between discs 14 and 15 in position to engage a fixed plate cam 61 secured to frame 10, and has a roller 62 for following the cam. A second arm 63 is secured to shaft 50 and has a roller 64 for engaging a groove 65 of a cam 66 secured to frame 10. The arrangement is such that at the feeding station indicated at A in Fig. 2, the feed table extends radially away from shaft 13, roller 62 is resting on cam 61 and roller 64 is just leaving groove 65. In position B the feed table is retracted and roller 62 is following cam 61, while at positions C and D, the roller 62 has left the cam, roller 64 has not reached cam 66 and the feed table is retained in retracted position by the force of gravitation. Between positions D and A, roller 64 enters cam groove 65 and the feed table is extended.

For feeding the material from the roll 70 on shaft 21 while preventing stretching thereof, and simultaneously winding the liner upon a roll 71, a shaft 72 is rotatably mounted on discs 14, 15 parallel to shaft 13. A pair of arms 73, 73 extend in the same direction and in spaced apart relation. A shaft 75 extends between their free ends, and a free-running roller 76 is mounted thereon for rotation. A free-running roller 77 is mounted for rotation on shaft 72. A gear 78 is fixed to roller 77 and a similar gear 79 is fixed to roller 59 with the gears meshing with each other so that rollers 59 and 77 rotate in unison. Fabric 80 and its separating liner 81 are unwound from roll 70 and pass between rollers 59 and 77. The liner proceeds about roller 77 to roll 71 where it is rewound. The fabric passes about roller 59 and under roller 76 before passing over rollers 54, 55. It will be evident that as roller 71 is rotated by motor 38 thereby rotating gear 78, roll 59 will be rotated thereby in the opposite direction separating the cord material from the liner and feeding it into a loop 85 about roller 76. The rollers 59 and 77 are so close to each other that diagonally disposed cords in the material readily span the distance between the roller 59 and the line of separation of the cord material and the liner so that relatively no stretch of the cord material occurs. To eliminate stretch of the cord material between roll 59 and the tire building drum, the loop 85 of material about roll 76 is maintained in slack condition. To accomplish this shaft 31 may be rotated by starting motor 38 before any material is drawn from the feed table and thereafter material is drawn from the loop 85 onto the drum. The motor 38 may be started as soon as the feed table approaches position A to form such a loop. This may be accomplished automatically by a timer switch 39 on timer 44 which is geared to shaft 13 by gears 83 and 84 so that upon approach of the feed table within a short distance of station A, the switch closes the circuit of motor 38 provided that a limit switch 82, hereinafter described, in the same circuit is closed by the absence of a sufficient loop of the cord material. If a sufficient length of material in the loop is present, the motor 38 does not start although timer switch 39 remains closed as long as the feed table remains at station A. Limit switch 82, normally open, is mounted on a stationary part of the machine, such as on cam 61, and may be engaged by arm 73 to close it upon raising of the arm. Motor 38 operates until the timer switch is opened by further rotation of its timer cam by indexing movement of the reel or until limit switch 82 is opened. Limit switch 82 is closed to start motor 38 again whenever the loop is so shortened as to raise arms 73 and is opened by lowering thereof with consequent stopping of motor 38.

While only one feed table and associated mechanism has been described in detail, it is to be understood that similar mechanism is supplied at each delivery station about the reel. The cover 46 of each feed table may be coated with adhesive material so that the leading end of the cord material may be turned back and temporarily adhered thereto when not being fed to the building drum to eliminate hanging ends.

By locating the stock rolls on the shafts 20, 21, 22, 23 near the periphery of the reel, larger supplies of material may be stored on the reel and the liner wind-up rolls are located closer to the center of the reel as they do not build up to such a large diameter due to thinness of the liner. All of the stock and liner rolls are retained on their shafts by removable collars such as 90 having setscrews 91 for locking them to the shafts, and are aligned by coil springs 92 which press them toward the collars.

In the operation of the apparatus, stock shells or rolls loaded with interwound cord material and liner are placed on each shaft 20, 21, 22 and 23 and empty stock shells are placed upon shafts 31, 32, 33, 34. The ends of the liners are passed between rollers 59 and 77 and about roller 77 to the shell 71 on shaft 31 and are secured to shells 71. The cord fabric material is led over roller 59, under roller 76 and over rollers 54 and 55. The fences or guides are adjusted for width and the cover 46 is closed. The end of the material is then thrown back over the cover and adhered thereto.

The operator then rotates the reel in a clockwise direction, as seen in Fig. 2, to bring the first feed table to feeding position at station A. Upon arrival of the feed table at station A, the timer switch 39 is closed and, providing limit switch 82 is also closed by shortness of the loop of cord material, closes the control circuit of motor 38 and the motor rotates roll 71 until a loop of material is drawn from roll 70 and arms 73 lowered whereupon motor 38 stops. The operator then applies the end of the cord material to the building drum and rotates the drum to draw off the desired amount of cord material. As the loop about roller 76 shortens, motor 38 is again automatically started by closing of limit switch 82 to refill the loop. After a complete convolution of cord material has been applied to the building drum, the operator cuts the withdrawn material and pastes the end back over the cover 46. He then pushes a button 45 to start motor 40 to rotate the reel clockwise to its next position.

During movement of the reel, the cam 61 folds the feed table previously used back against the reel and cam 66 extends the next feed table to feeding position.

As all of the pull upon the cord material occurs between rolls 59 and 77 which are geared together and are close to each other so that a majority of the cords extend from roll 59 to the line of separation of the cord material from the liner, substantially no stretch of the material occurs and as the material is delivered immediately into a free loop it recovers any elongation of the cord.

The extending feed tables deliver the cord material in close proximity to the face of the building drum so that the material is guided accurately and after delivery of the material the tables are retracted so as to be out of the way of stitching mechanism employed in forming the material about the drum.

The arrangement of the stock rolls near the periphery of the reel provides for storage of a large amount of material, reducing time necessary for reloading.

The power operation of the reel reduces the necessary exertion of the operator and permits him to devote more time to other duties.

Variations may be made without departing from the scope of the invention as it is defined by the following claims.

We claim:

1. Tire building apparatus comprising a rotatable reel for storing and delivering sheet material to a building drum, said reel comprising a rotatable frame having supports for a plurality of rolls of sheet material, means for rotating the reel step by step to present the rolls of material in succession at a feeding station, a feed table hingedly mounted on said reel, and means for effecting extension of said feed table from said reel at said feeding station and retraction of said feed table at other positions in the path of movement of said reel.

2. Tire building apparatus comprising a rotatable reel for storing and delivering sheet material to a building drum, said reel comprising fabric storage rolls, liner wind-up rolls, means for driving a wind-up roll to draw fabric from a storage roll, a pair of free-running rolls in closely spaced apart parallel relation for engaging the fabric and liner respectively as they are unwound from the storage roll, and gear means for driving one of said rolls from the other to separate the liner and fabric with minimum stretch of the fabric.

3. Tire building apparatus comprising a rotatable reel for storing and delivering sheet material to a building drum, said reel comprising a rotatable frame having supports for a plurality of rolls of sheet material, means for rotating the reel step by step to present the rolls of material in succession at a feeding station, a feed table hingedly mounted on said reel, and stationary cams engaging said feed table for effecting extension of said feed table from said reel at said feeding station and retraction thereof at other positions in the path of movement of said reel.

4. Tire building apparatus comprising a rotatable reel for storing and delivering sheet material to a building drum, said reel comprising fabric storage rolls near the periphery of the reel, liner wind-up rolls near the center of the reel, frictional driving means for engaging said liner wind-up rolls in succession to draw fabric from an adjacent storage roll, a pair of closely associated rollers for engaging respectively the fabric and the liner as they are rewound from the storage roll, and gear means for driving one of said rolls from the other to separate the liner and fabric with minimum stretch of the fabric.

5. Tire building apparatus comprising a rotatable reel for storing and delivering sheet material to a building drum, said reel comprising fabric storage rolls and liner wind-up rolls, said wind-up rolls having driving wheels thereon, driving means in the path of said driving wheels during rotation of said reel for engaging said wheels in succession to drive said rolls at one position of said reel to draw fabric from a storage roll while separating a liner therefrom, said driving means being arranged to deliver the separated fabric to a depending loop thereof, means for withdrawing the fabric from said loop, and means controlled by the size of said loop for controlling operation of the driving means from said wind-up roll.

6. Tire building apparatus comprising a rotatable reel for storing and delivering sheet material to a building drum, said reel comprising a rotatable frame having supports for a plurality of rolls of sheet material, a motor for rotating said reel about its axis step by step to present the rolls of material in succession at a feeding station, means mounted on the frame for extension therefrom as each roll is successively moved to the feeding station for withdrawing the sheet material from the roll at the feeding station, a timer and means actuated by said timer for slowing and stopping said motor in succession as a roll of material on said reel approaches said feeding station.

7. Tire building apparatus comprising a rotatable reel for storing and delivering sheet material to a building drum, said reel comprising a rotatable frame having supports for a plurality of rolls of sheet material, a motor for rotating said roll about its axis step by step to present the rolls of material in succession at a feeding station, material feeding means on said reel at each roll extensible from the reel at the feeding station for feeding material therefrom, a timer, means actuated by said timer for slowing and stopping said motor in succession as a roll of material approaches said feeding station, and means actuated by said timer for advancing sheet material from a storage roll as the feeding means approaches said feeding station.

8. Tire building apparatus comprising a frame, an open-sided reel mounted on said frame for rotation thereabout, a plurality of stock-roll supports on said reel for supporting rolls of liner-wound sheet material at positions near its periphery, a plurality of liner-rewinding supports on said reel near its axis for rewinding the liners from said rolls of liner-wound material, roll means on said reel adjacent each stock roll support for withdrawing sheet material from a stock roll thereon, a motor for rotating said reel about its axis step by step to present said stock rolls in succession at a feeding station, a timer, frictional driving means on said frame and engageable by said liner-rewinding supports in succession at said feeding station for driving them, means actuated by said timer for slowing and stopping said motor in succession as a roll of material on said reel approaches said feeding station, and other means actuated by said timer for advancing sheet material from a storage roll as the roll approaches said feeding station.

9. Tire building apparatus comprising a frame, an open sided reel mounted on said frame for rotation thereabout, a plurality of stock-roll supports on said reel for supporting rolls of liner-wound sheet material at positions near its periphery, a plurality of liner-rewinding supports on said reel near its axis for rewinding the liners from said rolls of liner-wound material, roll means adjacent each stock roll support for withdrawing sheet material from a stock roll thereon, feed tables pivotally mounted on said reel at each of said roll means for extension outwardly of said reel to guide said sheet material, cam means on said frame for swinging said feed tables outwardly in succession at a feeding station, a motor for rotating said reel about its axis step by step to present said feed tables in succession at said station, a timer, means on said support and engageable by said liner-rewinding supports in succession at said feeding station for driving them, means actuated by said timer for slowing and stopping said motor in succession as a roll of material on said reel approaches said feeding station, and other means actuated by said timer for advancing sheet material from a storage roll as the roll approaches said feeding station.

10. Tire building apparatus comprising a reel rotatable about a horizontal axis to present material selectively at a delivery station for use in building tires, a plurality of storage rolls mounted about said reel in spaced-apart relation, a feed table at each storage roll pivotally mounted on said reel for swinging movement outwardly of the reel to guide material from a storage roll at said station, a liner-rewinding means on said reel at each storage roll for rewinding a liner therefrom as material is being delivered over said feed table, stationary cam means for swinging a feed table outwardly of said reel at said feeding station while maintaining other feed tables in retracted positions, means for rotating said reel, and means effective upon arrival of a feed table in extended position at said delivery station for operating the corresponding liner rewinding means to withdraw a liner from the material as the material is delivered by said feed table.

11. Tire building apparatus comprising a movable frame for supporting a roll of sheet material, a feed table pivotally mounted on the frame for withdrawing material from the roll at a feeding station, means for moving the frame to bring the feed table to the feeding station, means engageable with the feed table for swinging the feed table pivotally in one direction to extend the feed table from the frame when the feed table is moved into said feeding station, and means for swinging the feed table pivotally in the reverse direction to retract the feed table into the frame when the feed table is moved away from said feeding station.

12. Tire building apparatus comprising a frame member, and mounted on the frame member: a rotatable support for a storage roll of liner-wound sheet material, a liner-winding roll, a feed table for delivering the sheet material to a feeding station adjacent the feed table, and a pair of rollers disposed parallel to each other and spaced relatively close together to permit the passage of the liner-wound sheet material between them, the liner being supported by and extending around one of said rollers to the liner-winding roll, and the sheet material being supported on the other roller and leading away from the liner to the feed table; means for driving the liner-winding roll to unwind the liner-wound sheet material from the storage roll and to separate the liner and sheet material between said pair of rollers, a loop-forming roller between the material-supporting roller and the feed table around which the material is looped between its support roller and the feed table, the loop-forming roller being supported for lateral movement to vary the length of the loop in the material between the material-supporting roller and the feed table, and means actuated by the movement of the loop-forming roller to intermittently operate the driving means of the liner-winding roll to regulate the speed at which the material is unwound from the storage roll.

FRANK S. STERNAD.
JOHN P. SAPP.

References Cited in the file of this patent

UNITED STATES PATENTS

| Number | Name | Date |
| --- | --- | --- |
| 1,121,793 | Brucker | Dec. 22, 1914 |
| 1,282,294 | Ross | Oct. 22, 1918 |
| 1,800,182 | Kirk | Apr. 7, 1931 |
| 1,902,139 | Pfeiffer | Mar. 21, 1933 |
| 1,915,061 | Leguillon | June 20, 1933 |
| 2,039,532 | Heston | May 5, 1936 |
| 2,272,237 | Brown et al. | Feb. 10, 1942 |
| 2,340,267 | Haase | Jan. 25, 1944 |